United States Patent
Sherman et al.

(10) Patent No.: US 9,244,832 B1
(45) Date of Patent: Jan. 26, 2016

(54) CACHE LEARNING MODEL

(71) Applicant: EMC Corporation, Hopkinton, MA (US)

(72) Inventors: Yulia Sherman, Modiin (IL); Vadim Moldavsky, Sderot (IL); Philip Derbeko, Modiin (IL)

(73) Assignee: EMC Corporation, Hopkinton, MA (US)

( * ) Notice: Subject to any disclaimer, the term of this patent is extended or adjusted under 35 U.S.C. 154(b) by 323 days.

(21) Appl. No.: 13/832,963

(22) Filed: Mar. 15, 2013

(51) Int. Cl.
*G06F 12/02* (2006.01)

(52) U.S. Cl.
CPC .................................. *G06F 12/0246* (2013.01)

(58) Field of Classification Search
CPC .................................................. G06F 12/0246
USPC ........ 711/103, 154; 365/185.33; 703/2, 4, 17, 703/21
See application file for complete search history.

(56) References Cited

U.S. PATENT DOCUMENTS

| | | | | |
|---|---|---|---|---|
| 5,586,293 A * | 12/1996 | Baron et al. | | 711/118 |
| 5,666,509 A * | 9/1997 | McCarthy et al. | | 711/206 |
| 7,729,549 B2 * | 6/2010 | Yano | | 382/234 |
| 8,549,222 B1 * | 10/2013 | Kleiman et al. | | 711/114 |
| 8,732,163 B2 * | 5/2014 | Halasipuram et al. | | 707/720 |
| 8,862,645 B1 * | 10/2014 | Ma et al. | | 707/827 |
| 8,949,531 B2 * | 2/2015 | Uttamchandani et al. | | 711/118 |
| 9,043,535 B1 * | 5/2015 | Derbeko | G06F 12/0246 | 711/103 |
| 2009/0265156 A1 * | 10/2009 | Taillefer et al. | | 703/21 |
| 2010/0185816 A1 * | 7/2010 | Sauber et al. | | 711/122 |
| 2011/0035369 A1 * | 2/2011 | Halasipuram et al. | | 707/720 |
| 2013/0254457 A1 * | 9/2013 | Mukker et al. | | 711/103 |
| 2014/0156909 A1 * | 6/2014 | Farhan et al. | | 711/103 |
| 2014/0156910 A1 * | 6/2014 | Uttamchandani et al. | | 711/103 |

* cited by examiner

*Primary Examiner* — Stephen Elmore
(74) *Attorney, Agent, or Firm* — Krishnendu Gupta; Konrad R. Lee

(57) ABSTRACT

A computer-executable method, system, and computer program product for managing a flash cache, having modes of cache management, the computer-executable method, system, and computer program product may be enabled to optimize flash cache by using a model to determine an optimized mode for the flash cache.

15 Claims, 9 Drawing Sheets

CACHE LEARNING MODEL

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a flash cache, having modes of cache management, the computer-executable method, system, and computer program product comprising optimizing the flash cache by using a model to determine a first mode of the modes of the flash cache, wherein the model is used to analyze an activity of the flash cache.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
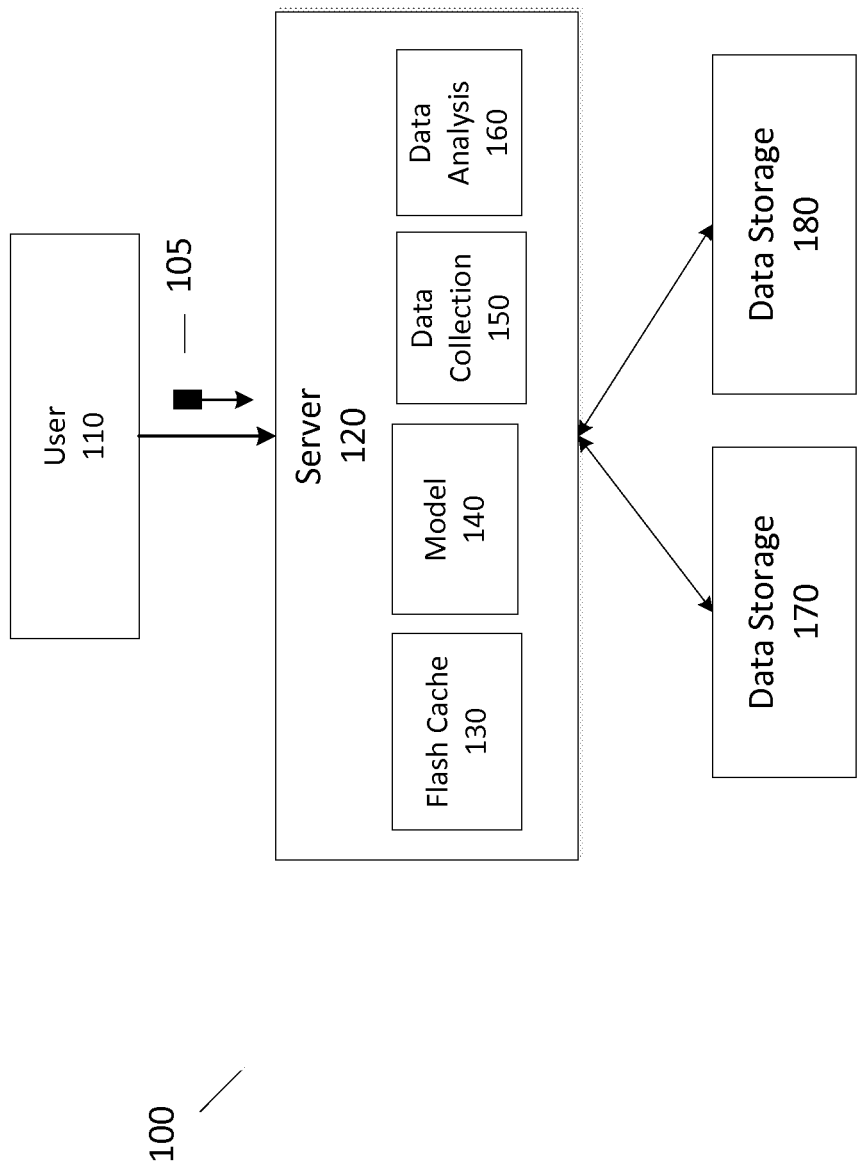
FIG. 1 is a simplified illustration of a data storage system using a flash caching solution, in accordance with an embodiment of the present disclosure.

Typically, flash caching solutions operate in one or more modes. Generally, performance of a flash caching solution may be affected depending on which mode is chosen. Traditionally, a mode may be chosen based on prior knowledge of a data storage device or a data storage system. Conventionally, being able to dynamically optimize cache performance of a flash caching solution may be beneficial to the performance of a data storage device or a data storage system.

In many embodiments, the current disclosure may enable dynamic optimization of a flash caching solution. In some embodiments, the current disclosure may enable a user, customer, or administrator to use a learning scenario to create a model to optimize a flash caching solution. In various embodiments, a learning scenario may include collected performance statistics while having a flash caching solution processing a simulated scenario. In particular embodiments, a simulated scenario may include having a flash caching solution process a read and/or write scenario. In certain embodiments, a simulated scenario may include having a flash caching solution process simulated data. In many embodiments, a simulated scenario may include having a flash caching solution process a read and/or write scenario using simulated data.

In many embodiments, the current disclosure may enable a flash caching solution to switch between cache modes to test each cache mode. In various embodiments, the current disclosure may enable a flash caching solution to choose the best mode suitable for a given working environment. In some embodiments, the best mode suitable for a given working environment may include a mode where a flash caching solution may operate faster than other available modes. In other embodiments, the current disclosure may enable a flash caching solution to collect data in one mode which may be used to determine which mode may be best suited for a given working environment. In many embodiments, a best mode suitable for a given working environment may include an optimized mode. In some embodiments, determining an optimized may include determining whether an application may have a faster storage response time in a particular mode, thus performing data storage operations faster than when configured in an alternate mode.

In various embodiments, the current disclosure may enable a user, customer, or administrator to use flash cache performance statistics to create a model that may enable optimization of a flash caching solution. In some embodiments, a model may be created by analyzing a flash caching solution in one or more simulated scenarios. In particular embodiments, a model may be created by analyzing performance statistics collected while a flash caching solution may be processing one or more simulated scenarios. In some embodiments, the analysis may include comparing operation of a flash caching solution in one or more modes while the flash caching system is processing a simulated situation. In some embodiments, a flash caching solution may have one or more modes enabling the caching solution to be optimized based on current or future usage of a data storage device and/or data storage system. In various embodiments, a caching solution may include EMC VFCache™

Typically, EMC VFCache™ may be a server flash caching solution that reduces latency and increases throughput to dramatically improve application performance by leveraging intelligent caching software and PCIe flash technology. Generally, VFCache may accelerate reads and protects data by using a write-through cache to the networked storage to deliver persistent high availability, integrity, and disaster recovery. Conventionally, on a write request, VFCache may first write to an array, then to the cache, and then may complete the application IO. Traditionally, on a read request, VFcache may satisfy a request with cached data, or, when the data is not present, may retrieve the data from the array, write the data to cache, and then may return the data to the application.

Generally, VFCache may operate in one or more modes. Traditionally, the modes of VF Cache may include Mode #1, a cache all writes mode or current write mode, Mode #2, a no caching for writes mode or invalidate mode, and Mode #3, a cache on write-hit mode. Typically, Mode #1 may mean when every write received is written to cache. Generally, Mode #2 may mean that corresponding entries in memory may be signed invalid. Conventionally, Mode #3 may mean that data is written to the cache only in instances where the data may already exist in cache. Traditionally, there may be difficulties switching between cache modes in order to test each mode and choose the best cache mode for a given working environment.

In many embodiments, the current disclosure may enable creation of a model enabled to predict and/or estimate the performance of a flash caching solution in one or more scenarios. In some embodiments, the model may be created by analyzing performance statistics collected from a flash caching solution. In various embodiments, performance statistics may be collecting from a flash caching solution while the flash caching solution may be in an active state. In particular embodiments, an active state may include a state where a flash caching solution may be actively processing customer data.

In various embodiments, performance statistics may be collected from a flash caching solution while the flash caching solution may be processing a simulated scenario. In some embodiments, performance statistics may be collected while a flash caching solution may be in an offline state. In particular embodiments, an offline state may mean a state where a flash caching solution may not be actively processing customer data. In many embodiments, a simulated scenario may include simulated data. In some embodiments, a simulated scenario may include a read and/or write scenario. In various embodiments, a simulated scenario may include simulated data and a read and/or write scenario. In particular embodiments, a simulated scenario may encompass every variation of data processing and/or read and write scenarios that a caching solution may encounter.

In many embodiments, the current disclosure may enable the use of performance statistics to create a model that may be enabled to predict and/or estimate the performance of a flash caching solution one or more modes. In some embodiments, a model may be used to map a simulated scenario to a best suited mode of a flash caching solution. In various embodiments, a model may enable a caching solution to map a simulated scenario to an active state. In some embodiments, a model may include one or more data patterns that may be mapped to one or more modes of a flash caching solution. In various embodiments, a data pattern may include a collection of data processing, a type of data being processed, and/or an amount of read and writes being processed. In particular embodiments, a model may enable selection of a mode best suited for an active state. In various embodiments, the current disclosure may enable a flash caching solution to choose an optimized mode based on a model. In certain embodiments, the current disclosure may enable a flash caching solution to dynamically change optimized modes based on a model. In various embodiments, a model may map one or more data patterns to one or more modes of a flash caching solution.

In many embodiments, a model may include an algorithm that may combine different variable selection methods in order to estimate a consensus optimization choice between each of the variables. In other embodiments, an algorithm may combine different variable selection techniques to select predictors for cache optimization. In some embodiments, an algorithm may use a random-forest technique and/or a stochastic gradient boosting technique as a predictor of importance of each variable. In various embodiments, data to be analyzed by a model may be divided into chunks of data. In particular embodiments, the chunks of data may be analyzed independently. In certain embodiments, one or more techniques may be used to determine a score for each chunk of data. In particular embodiments, each score for each chunk of data may be normalized (i.e. between 0 and 100). In various embodiments, a final score for each predictor may be calculated as a sum of all scores that the one or more techniques used to determine importance of each variable. In some embodiments, the determined importance of each variable may be averaged among all data chunks.

In many embodiments, a flash caching solution may be queried to provide the following performance statistics, such as:
Total number of pending reads
Total number of pending writes
Total number IOs
Total number of reads
Total number of read-hits
Total number of writes
Total number of write-hits
Total number of skipped IO
Total number of unaligned IOs
Total Kbytes transferred for reads
Total read latency in microseconds
Total Kbytes transferred for writes
Total write latency in microseconds.

In various embodiments, the above-mentioned performance statistics may be used as predictive variables in a model to determine an optimized mode for a flash caching solution.

In many embodiments, flash cache performance statistics may be collected in each available mode of a flash caching solution. In some embodiments, flash cache performance statistics collected in one mode may be applied to a second mode. In various embodiments, an optimization of a flash caching solution having one or more modes may be created from performance statistics collected in a single mode.

In many embodiments, flash cache performance statistics may be collected in one cache mode. In some embodiments, flash cache performance statistics may be collected in a cache all writes mode which may enable collection of all available statistical information for application data flow. In various embodiments, the current disclosure may enable collection of performance statistics in an offline mode. In particular embodiments, an offline mode may include running test data through a flash caching solution while recording performance statistics. In many embodiments, a flash cache may be placed in a learning phase where simulated data and/or read/write-scenarios may be passed to the flash cache while performance statistics are being recorded. In various embodiments, performance statistics may be recorded in each mode configuration of a flash caching solution.

In many embodiments, collected performance statistics may be used to create a model that may be enabled to predict and/or estimate the cache performance of a flash cache solution in one or more modes. In some embodiments, the model may be created based on performance statistics collected in a cache all writes mode. In various embodiments, a model may enable a flash caching solution to dynamically change modes depending on the working environment.

In many embodiments, the current disclosure may enable a caching solution to adapt to a current state. In various embodiments, a current state may include a current data processing load. In some embodiments, a flash caching solution may collect performance statistics while in an active state. In various embodiments, performance statistics collected in an active state may be analyzed using a model. In particular embodiments, performance statistics collected in an active state may be compared to a model.

In many embodiments, the current disclosure may enable a caching solution to adapt to an active state, where the flash caching solution is currently processing customer data. In some embodiments, a flash caching solution may collect performance statistics in an active state. In various embodiments, performance statistics collected in an active state may be used to determine an optimized mode. In certain embodiments, performance statistics collected in an active state may be compared with a model to determine an optimized mode. In other embodiments, performance statistics collected in an active state may be analyzed using a model. In some embodiments, model analysis of performance statistics collected in an active state may include mapping data patterns within the model to the performance statistics. In various embodiments, the current disclosure may enable the flash caching solution to dynamically change modes based on the model analysis of performance statistics of an active state. In many embodiments, performance statistics of an active state may be collected during finite time intervals. In some embodiments, a time interval may be measured in seconds, minutes, dozens of minutes, or other time increments.

In many embodiments, the current disclosure may enable a computer-executable method for managing a flash cache, having modes of cache management, the computer-executable method including optimizing the flash cache by using a model to determine a first mode of the modes of the flash cache, wherein the model is used to analyze an activity of the flash cache.

Refer now to the example embodiment of FIG. 1. The example embodiment of FIG. 1 illustrates a data storage system using a flash caching solution, in accordance with the current disclosure. In this embodiment, data storage system 100 includes server 120 and data storage devices 170 and 180. As shown, server 120 includes flash cache 130, model 140, data collection module 150, and data analysis module 160. In FIG. 1, user 110 is sending data request 105 to retrieve data from data storage system 100. In many embodiments, a user's data request may be fulfilled from flash cache or data storage depending on the mode used by the flash cache. In various embodiments, a data storage system may use a model to determine a flash cache's specified mode.

Figure 2:
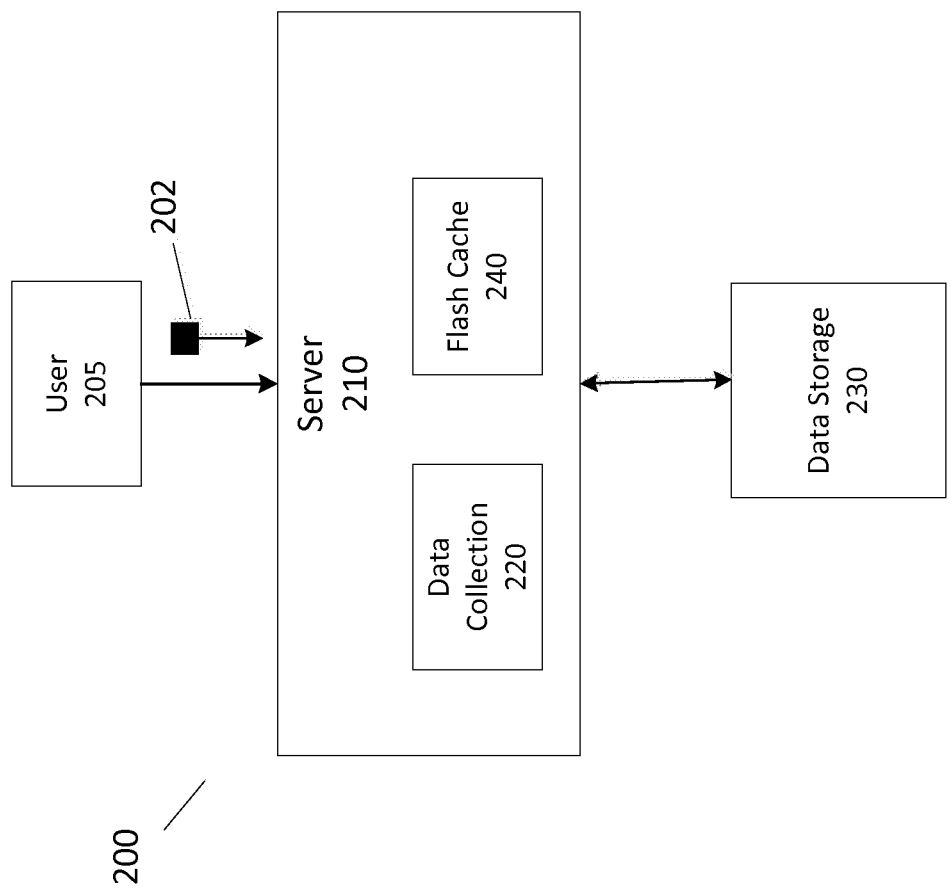
FIG. 2 is a simplified illustration of a data storage system collecting statistics, in accordance with an embodiment of the present disclosure.

Refer now to the example embodiment of FIG. 2. The example embodiment of FIG. 2 illustrates a simplified illustration of a data storage system collecting statistics, in accordance with the present disclosure. In this embodiment, data storage system 200 includes server 210 and data storage device 230. Server 210 includes data collection module 220 and flash cache 240. In FIG. 2, User 205 is sending simulated data 202 to data storage system 200. In this embodiment, data collection module 220 is recording performance statistics on how server 210 responds to simulated data 202. As shown, Flash Cache 240 is in cache all writes mode which enables data collection module 220 to collect all available performance statistics related to flash cache 240, data storage 230 and Server 210. In many embodiments, simulated data may include read-write scenarios. In some embodiments, a read/write scenario may include different ratios of reads and writes. For example, in particular embodiments, a read/write scenario may include 80% reads and 20% writes. In other embodiments, a read/write scenario may be comprised of other ratios and reads and writes (i.e. 70% reads/30% writes, 50% reads/50% writes, or other variations). In various embodiments, simulated data may include different sizes and/or types of data. In certain embodiments, simulated data may include different I/O sizes (i.e. 4 KB, 8 KB, 16 KB, 32 KB, and/or various other sizes of I/O).

Figure 3:
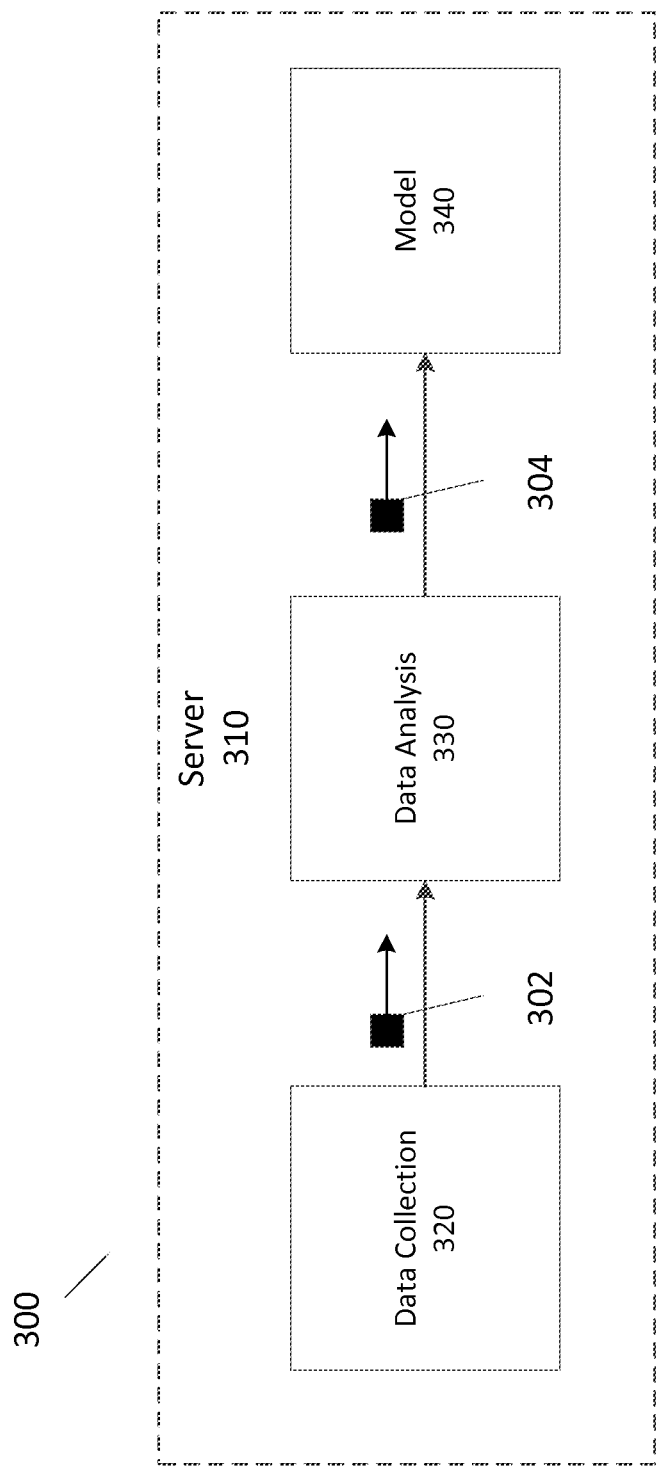
FIG. 3 is a simplified illustration of a data storage system creating a model, in accordance with an embodiment of the present disclosure.

Refer now to the example embodiment of FIG. 3. The example embodiment of FIG. 3 is a simplified illustration of a data storage system creating a model enabled to dynamically optimize the flash cache. In this embodiment, data storage system 300 includes server 310. Server 310 includes data collection module 320, data analysis module 330, and model module 340. In FIG. 3, data collection module sends collected performance statistics 302 to data analysis module 330. In this embodiment, data analysis module 330 creates a model enabled to dynamically optimize flash cache based on the collected performance statistics 302. As shown, data analysis module 330 sends message 304 containing a mathematical model to Model module 340. Server 310 is enabled to access mathematical model within model module 340 to optimize data storage system 300. In this embodiment, data analysis module 330 analyses collected performance statistics 302 to determine which mode of the flash caching solution may be best suited for the current active state.

Figure 4:
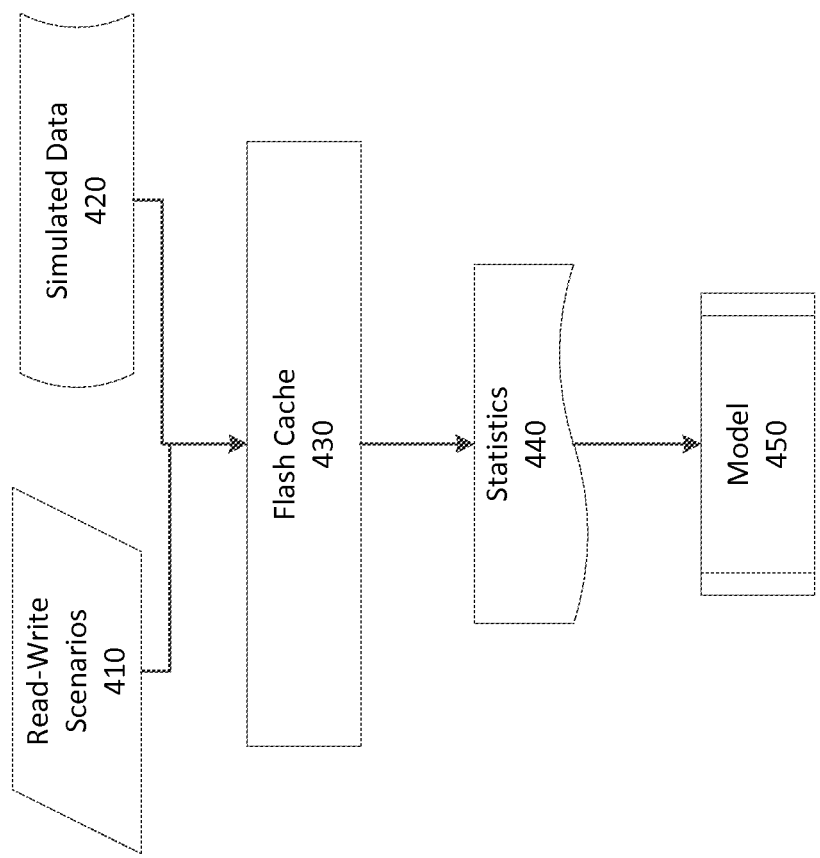
FIG. 4 is a simplified data flow diagram of a data storage system creating a model in accordance with an embodiment of the present disclosure.

Refer now to the example embodiment of FIG. 4. The example embodiment of FIG. 4 is a simplified data flow diagram of a data storage system creating a model in accordance with the current disclosure. In this embodiment, a data storage system is in an offline state to create a model enabled to be used to dynamically optimize flash cache 430. As shown, read-write scenarios 410 and simulated data 420 are communicated to flash cache 430. In this embodiment, performance statistics 440 are collected from flash cache 430. Model 450 is created from performance statistics 440. In this embodiment, Model 450 is created from mapping data patterns within simulated data 420 and read-write scenarios 410 to performance collected in performance statistics 440. As shown, Model 450 is enabled to be used to provide optimization information on Flash Cache 430.

Figure 5:
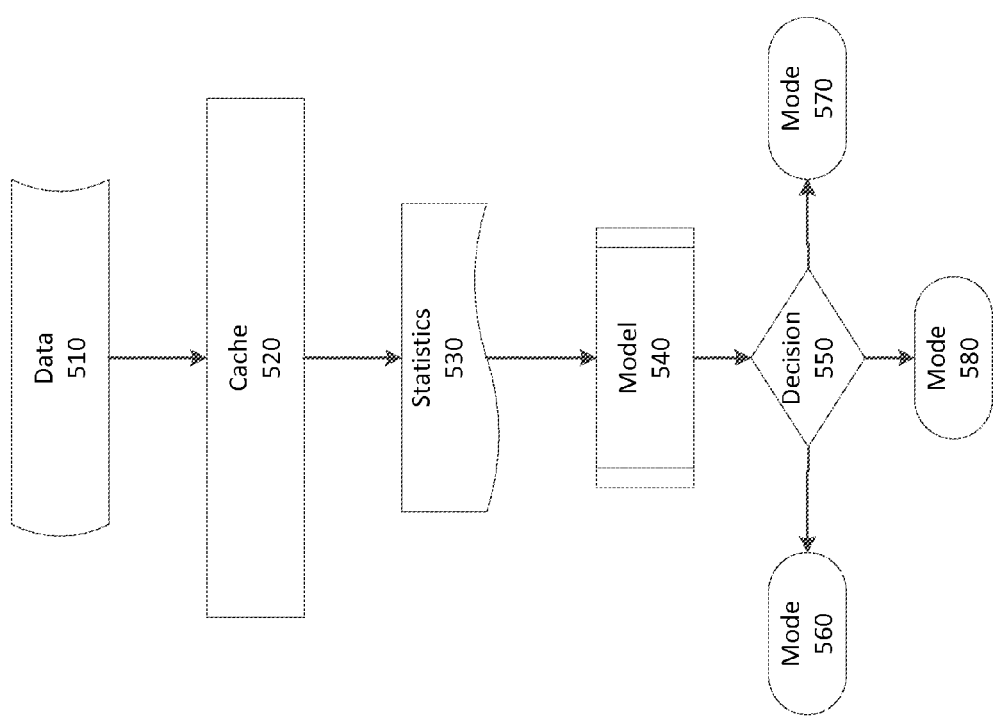
FIG. 5 is a simplified data flow diagram of a method of utilizing a model to make cache mode determinations, in accordance with an embodiment of the present disclosure.

Refer now to the example embodiment of FIG. 5. The example embodiment of FIG. 5 is a simplified data flow diagram of a method of utilizing a model to make cache mode determinations in accord with the current disclosure. In this embodiment, data 510 is being communicated to flash cache 520. Performance statistics 530 are being collected from flash cache 520. In this embodiment, performance statistics 530 are being collected during a time interval of one minute. Performance statistics 430 collected during the one minute interval are compared to model 540 to make decision 550. In various embodiments, performance statistics may include one or more data patterns which may be compared with, mapped to, and/or analyzed using a model to determine an optimized mode. In this embodiment, flash cache 520 is enabled to be placed into mode 560, mode 580, or mode 570. As shown, model 540 is enabled to determine an optimized mode.

Figure 6:
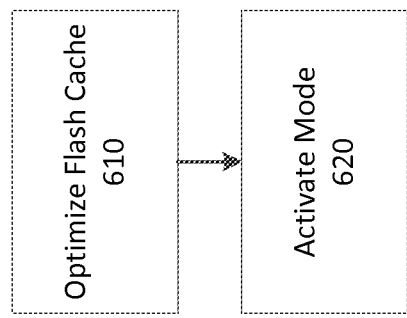
FIG. 6 is an example embodiment of a method of optimizing flash cache, in accordance with an embodiment of the present disclosure.

Refer now to the example embodiments of FIGS. 6 and 1. FIG. 6 illustrates a simplified flow of how a data storage system, as shown in FIG. 1, optimizes flash cache, in accordance with the current disclosure. As shown in FIG. 1, User 110 is sending data request 105 to server 120. User 110 is attempting to retrieve data from data storage system 100. In this embodiment, server 120 collects performance statistics using data collection 150 while user 110 is interacting with data storage system 100. In FIG. 1, data collection 150 sends the performance statistics to data analysis module 160, which creates a mathematical model in model module 140. As shown, server 120 is enabled to use model module 140 to optimize flash cache 130 (Step 610) by determining an optimal mode for flash cache 130. In this embodiment, Server 120 is enabled to activate the optimal mode (Step 620) on flash cache 130.

Figure 7:
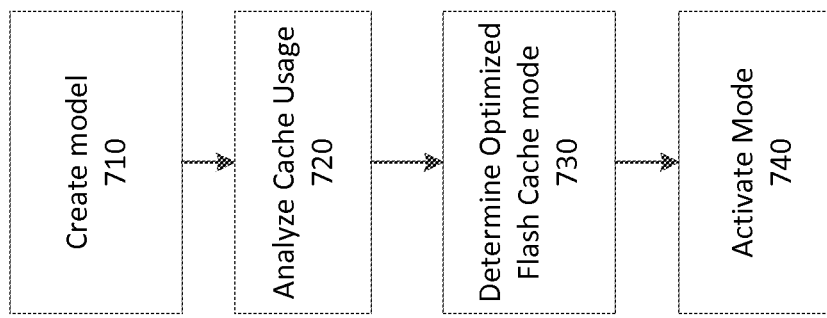
FIG. 7 is an alternate example embodiment of optimizing flash cache, in accordance with an embodiment of the present disclosure.

Refer now to the example embodiments of FIGS. 7 and 1. FIG. 7 illustrates an alternative flow of how a data storage system, as shown in FIG. 1, optimizes flash cache, in accordance with the current disclosure. As shown, User 110 is sending data request 105 to server 120. User 110 is attempting to retrieve data from data storage system 100. In this embodiment, server 120 creates model (Step 710) to optimize flash cache 130 and puts model into model module 140. In FIG. 1, Server 120 uses the model within model module 140 to analyze cache usage (Step 720) and determine an optimized flash cache mode (Step 730). In this embodiment, server 120 activates the determined optimized flash cache mode (Step 740).

Figure 8:
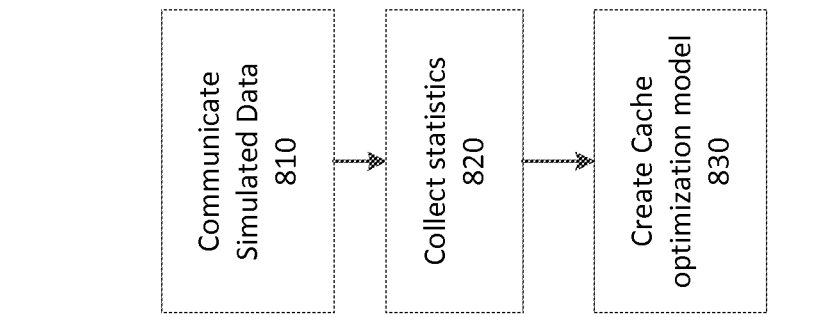
FIG. 8 is an example embodiment of a method of creating a model, in accordance with an embodiment of the present disclosure.

Refer now to the example embodiments of FIGS. 8 and 2. FIG. 8 illustrates a simplified flow of how a data storage system, as shown in FIG. 2, creates a model, in accordance with the current disclosure. As shown, user 205 communicates simulated data to data storage system 200 using data message 202. Data collection module 220 collects performance statistics (Step 820) on the interactions of flash cache 240 and data storage 230 when responding to data message 202. In this embodiment, server 210 creates an optimization model (Step 830) based on the interactions of flash cache 240 and data storage 230. As shown, the model is enabled to determine an optimized mode for flash cache 240.

Figure 9:
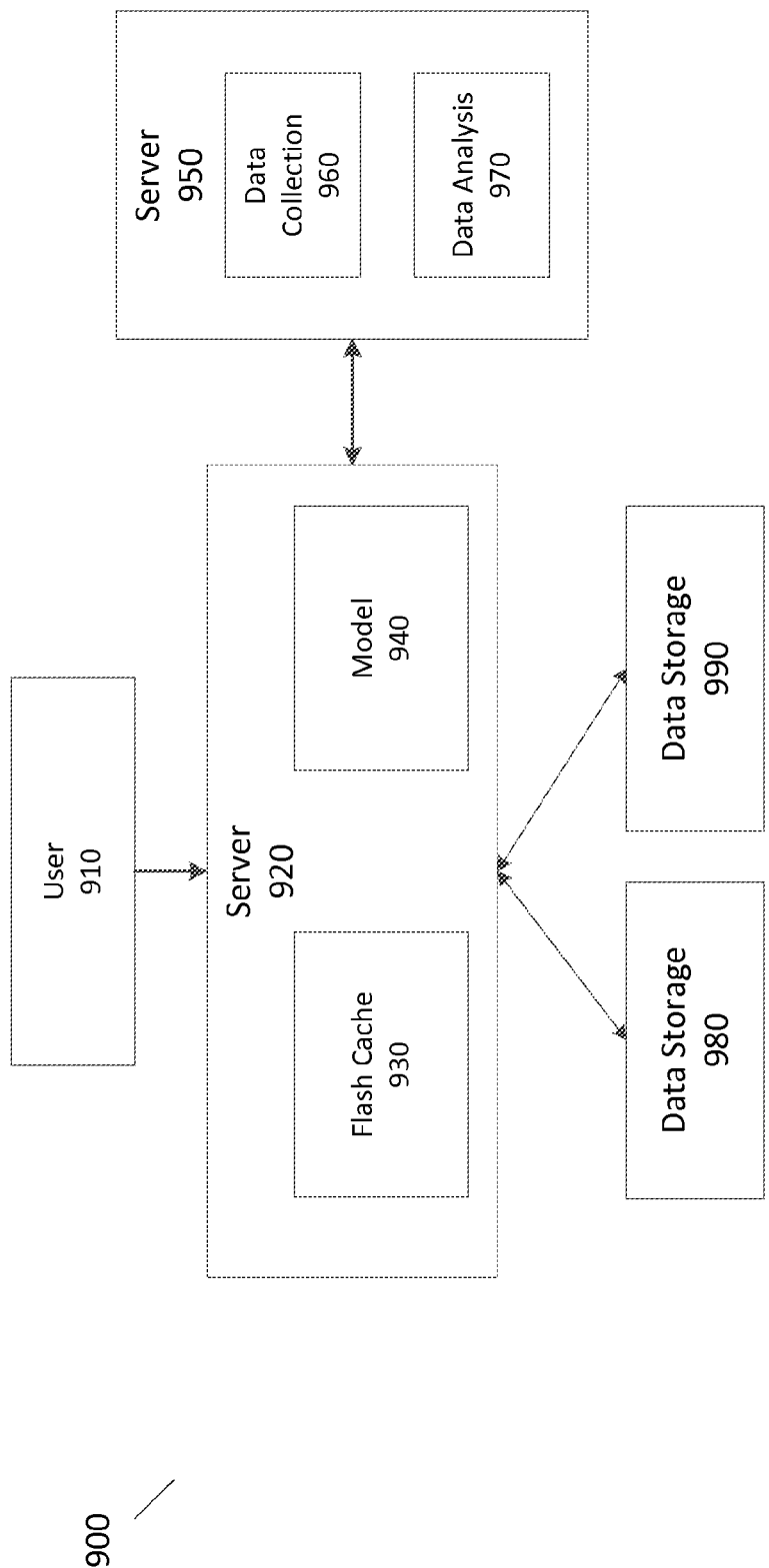
FIG. 9 is an alternative simplified illustration of a data storage system in an alternative configuration, in accordance with an embodiment of the present disclosure.

Refer now to the example embodiment of FIG. 9. FIG. 9 illustrates an alternative simplified illustration of a data storage system in an alternative configuration, in accordance with the current disclosure. As shown, data storage system 900 includes server 920, data storage 980, 990, and server 950. In this embodiment, server 920 includes flash cache 930 and model module 940. In FIG. 9, Server 950 includes data collection 960 and data analysis 970. In many embodiments, a data collection module and data analysis module may be located separately from the flash cache and model module enabled to dynamically optimize the flash cache.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
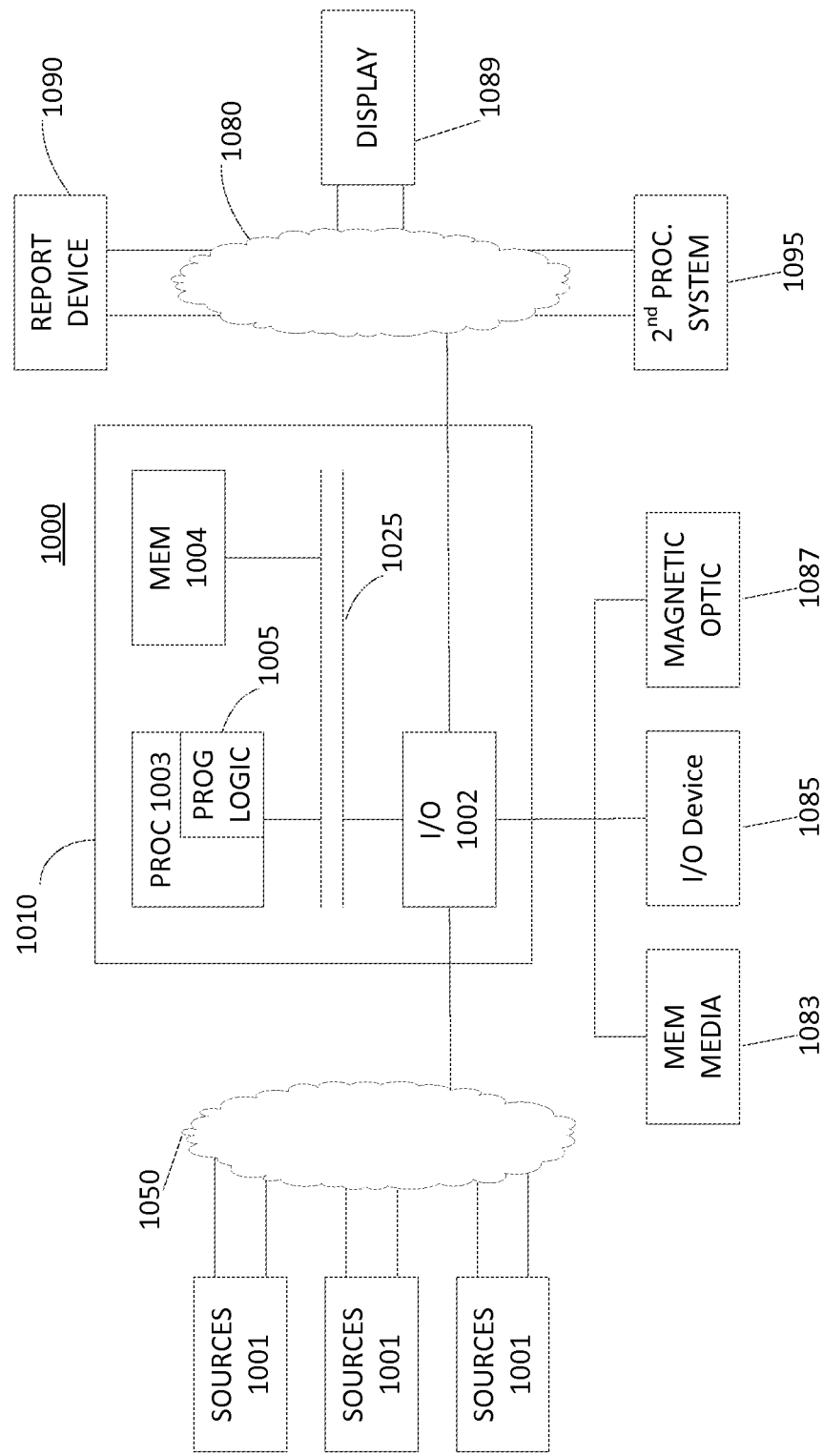
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 100, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic or optical drives. When the program code is loaded into memory 1004 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
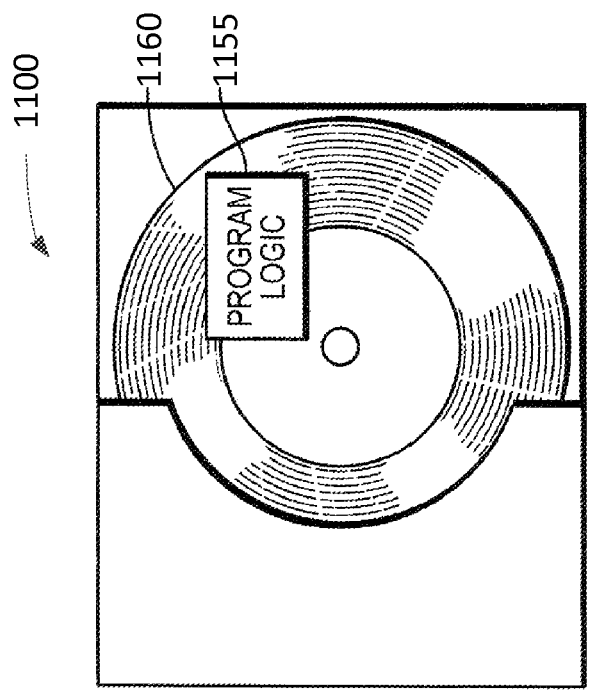
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method, on one or more processors and memory, for managing a flash cache, having modes of cache management, the computer-executable method comprising:

optimizing, via the one or more processors and memory, the flash cache by using a model to determine a first mode of the modes of the flash cache, wherein the model is used to analyze an activity of the flash cache.

2. The computer-executable method of claim 1, further comprising creating the model enabled to determine the first mode of the modes of the flash cache.

3. The computer-executable method of claim 2, wherein creating the model further comprises:
communicating simulated data to the flash cache;
collecting statistics while the flash cache is processing the simulated data; and
analyzing the statistics to create a model which includes a mapping of simulated data to the modes of flash cache.

4. The computer-executable method of claim 2, wherein the model is created in an offline state.

5. The computer-executable method of claim 1, wherein the optimizing further comprises:
collecting statistics on the activity of the flash cache; and
analyzing the collected statistics on the activity using the model to determine the first mode of modes of the flash cache.

6. A system, comprising:
a flash cache having modes of cache management; and
computer-executable program logic operating in memory, wherein the computer-executable program logic is configured to enable one or more processors to execute:
optimizing the flash cache by using a model to determine a first mode of the modes of the flash cache, wherein the model is used to analyze an activity of the flash cache.

7. The system of claim 6, wherein the computer executable program logic is further configured to enable one or more processors to execute creating the model enabled to determine the first mode of the modes of the flash cache.

8. The system of claim 7, wherein creating the model further comprises:
communicating simulated data to the flash cache;
collecting statistics while the flash cache is processing the simulated data; and
analyzing the statistics to create a model which includes a mapping of simulated data to the modes of flash cache.

9. The system of claim 7, wherein the model is created in an offline state.

10. The system of claim 6, wherein the optimizing further comprises:
collecting statistics on the activity of the flash cache; and
analyzing the collected statistics on the activity using the model to determine the first mode of the modes of the flash cache.

11. A computer program product, on one or more processors and memory, for managing a flash cache, having one or more modes, the computer program product comprising:
a non-transitory computer readable medium encoded with computer-executable program code executing on the one or more processors and memory, the code configured to enable the execution of:
optimizing the flash cache by using a model to determine a first mode of the modes of the flash cache, wherein the model is used to analyze an activity of the flash cache.

12. The computer program product of claim 11, wherein the code is further configured to enable the execution of creating the model enabled to determine the first mode of the modes of the flash cache.

13. The computer program product of claim 12, wherein creating the model further comprises:
communicating simulated data to the flash cache;
collecting statistics while the flash cache is processing the simulated data; and
analyzing the statistics to create a model which includes a mapping of simulated data to the modes of flash cache.

14. The computer program product of claim 12, wherein the model is created in an offline state.

15. The computer program product of claim 11, wherein the optimizing further comprises:
collecting statistics on the activity of the flash cache; and
analyzing the collected statistics on the activity using the model to determine the first mode of the modes of the flash cache.

\* \* \* \* \*